(12) United States Patent
Toya et al.

(10) Patent No.: US 11,361,464 B2
(45) Date of Patent: Jun. 14, 2022

(54) MEASUREMENT METHOD AND MEASUREMENT APPARATUS

(71) Applicant: KABUSHIKI KAISHA TOSHIBA, Minato-ku (JP)

(72) Inventors: Kiminori Toya, Kawasaki (JP); Hiroshi Ohno, Chuo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 337 days.

(21) Appl. No.: 16/795,670

(22) Filed: Feb. 20, 2020

(65) Prior Publication Data

US 2020/0286249 A1 Sep. 10, 2020

(30) Foreign Application Priority Data

Mar. 4, 2019 (JP) .............................. JP2019-038601

(51) Int. Cl.
| | |
|---|---|
| *G06T 7/70* | (2017.01) |
| *G01N 21/45* | (2006.01) |
| *G01N 21/95* | (2006.01) |
| *G02B 27/54* | (2006.01) |
| *G06T 7/00* | (2017.01) |
| *G02B 27/14* | (2006.01) |

(52) U.S. Cl.
CPC .............. *G06T 7/70* (2017.01); *G01N 21/45* (2013.01); *G01N 21/95* (2013.01); *G02B 27/14* (2013.01); *G02B 27/54* (2013.01); *G06T 7/0002* (2013.01); *G06T 2207/10* (2013.01)

(58) Field of Classification Search
CPC ..... G06T 7/70; G06T 7/0002; G06T 2207/10; G01N 21/45; G01N 21/95; G02B 27/14; G02B 27/54
See application file for complete search history.

(56) References Cited

U.S. PATENT DOCUMENTS

| | | | |
|---|---|---|---|
| 8,988,499 B2 * | 3/2015 | Noda | G06T 7/70 348/43 |
| 9,210,404 B2 * | 12/2015 | Hall | G06T 7/80 |
| 9,599,497 B1 * | 3/2017 | Haering, Jr. | G01P 3/38 |
| 9,710,917 B2 * | 7/2017 | Freeman | G06T 7/246 |
| 9,842,404 B2 * | 12/2017 | Freeman | G06T 7/246 |
| 11,252,325 B2 * | 2/2022 | Sivan | G06V 20/64 |
| 2016/0238386 A1 * | 8/2016 | Yang | H04N 5/33 |
| 2022/0066456 A1 * | 3/2022 | Ebrahimi Afrouzi | G05D 1/0246 |

FOREIGN PATENT DOCUMENTS

| | | |
|---|---|---|
| JP | 2007-285896 A | 11/2007 |
| JP | 2011-117951 A | 6/2011 |
| JP | 2019-211246 A | 12/2019 |
| WO | WO-9405118 A1 * | 3/1994 ............. G06K 9/209 |

* cited by examiner

*Primary Examiner* — Manav Seth
(74) *Attorney, Agent, or Firm* — Oblon, McClelland, Maier & Neustadt, L.L.P.

(57) ABSTRACT

According to one embodiment, a measurement method includes: acquiring a first picture including a background image and a substance, the substance allowing transmission of light from the background image; acquiring a second picture including the background image and the substance in a different positional relation with respect to the first picture; and calculating a first displacement amount representing a difference in position of the background image between the first picture and the second picture.

9 Claims, 14 Drawing Sheets

MEASUREMENT METHOD AND MEASUREMENT APPARATUS

CROSS-REFERENCE TO RELATED APPLICATIONS

This application is based upon and claims the benefit of priority from Japanese Patent Application No. 2019-038601, filed on Mar. 4, 2019, the entire contents of which are incorporated herein by reference.

FIELD

Embodiments described herein relate generally to a measurement method and a measurement apparatus.

BACKGROUND

The refractive index distribution of a light-transmissible substance or object, such as an optical component or gas, is measured by, for example, schlieren or background-oriented schlieren (BOS). By BOS, the refractive index distribution of a substance can be quantified.

BOS typically measures the refractive index distribution of a substance by comparing a measurement image representing a background through the substance and a reference image representing the background with the substance being removed. However, the substance removal or arrangement may take a certain time, and due to the passage of the time, the measurement image and the reference image may be acquired under different conditions. This may cause decrease in accuracy of measurements.

DETAILED DESCRIPTION

In general, according to one embodiment, a measurement method includes: acquiring a first picture including a background image and a substance, the substance allowing transmission of light from the background image; acquiring a second picture including the background image and the substance in a different positional relation with respect to the first picture; and calculating a first displacement amount representing a difference in position of the background image between the first picture and the second picture.

First Embodiment

Hereinafter, the first embodiment will be described with reference to FIG. 1 to FIG. 8. Note that, in the present specification, a vertically upward direction is basically defined as an upward direction, and a vertically downward direction is basically defined as a downward direction. Furthermore, in the present specification, a plurality of expressions may be used in terms of a constituent element according to an embodiment and description on the element. The constituent elements and description thereof are merely exemplary, and are not limited by the expressions given in the present specification. A constituent element may be identified with a name different from that in the present specification. Further, a constituent element may be described by using an expression different from that in the present specification.

Figure 1:
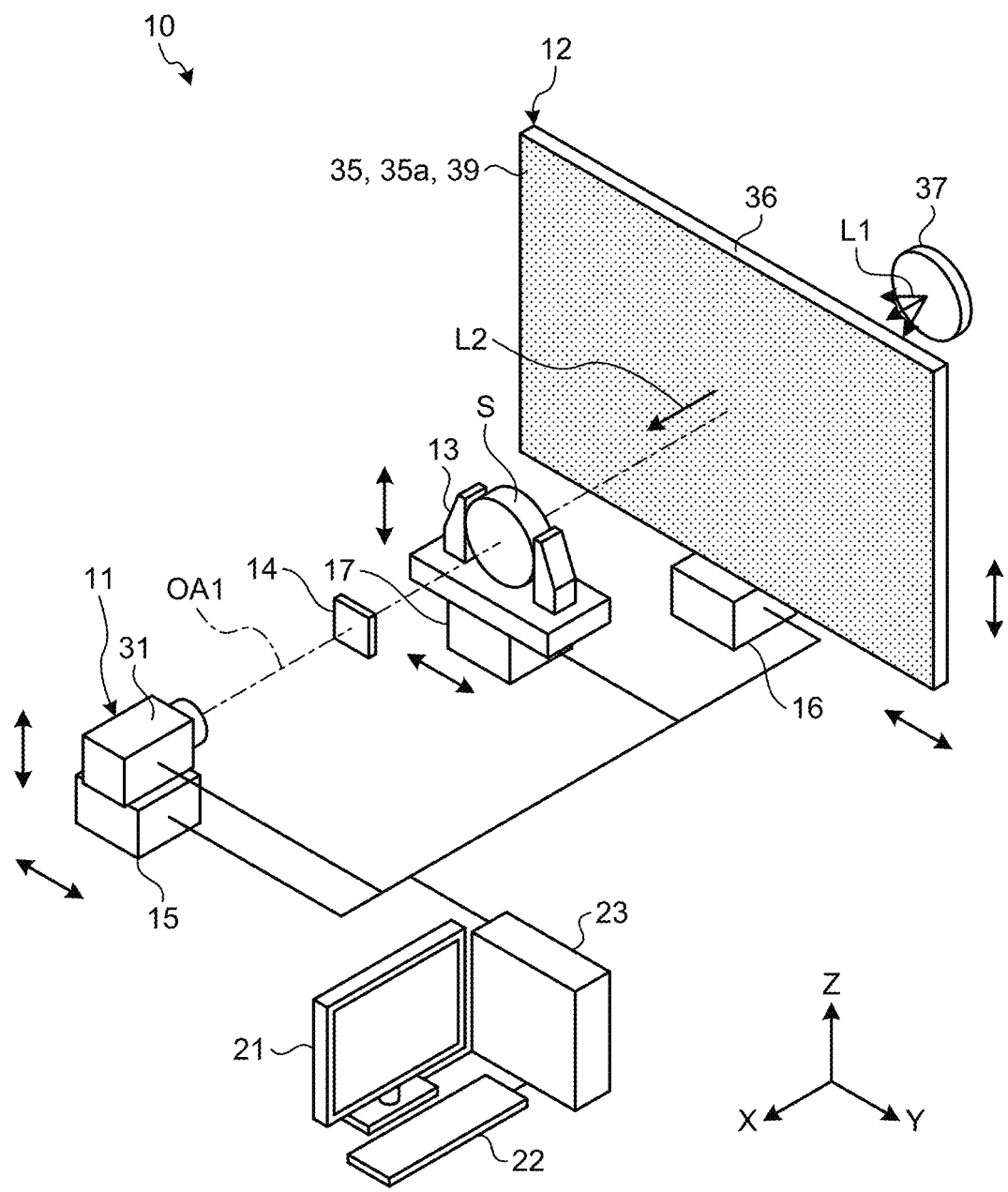
FIG. 1 is a perspective view schematically illustrating an exemplary measurement apparatus according to a first embodiment.

FIG. 1 is a perspective view schematically illustrating a measurement apparatus 10 according to the first embodiment. As illustrated in FIG. 1, the measurement apparatus 10 in the first embodiment includes an imaging device 11, a background device 12, a holder 13, a filter 14, a first moving device 15, a second moving device 16, a third moving device 17, an output device 21, an input device 22, and a controller 23. At least one of the first moving device 15, the second moving device 16, and the third moving device 17 is an example of a moving device.

The measurement apparatus 10 serves to measure, for example, an uneven refractive index distribution (hereinafter referred to as a refractive index gradient) of a substance S being a subject of observation. The measurement apparatus 10 is not limited to this example. The substance S is an exemplary substance.

The substance S is gas, liquid, or solid that allows transmission of light having a wavelength photographable by the imaging device 11. The substance S in the present embodiment is a solid. Examples of the solid substance S include optical components such as a lens and a prism, and a semiconductor such as SiC. The substance S may be a thermal fluid or a fluid having an uneven distribution of density such as a gas through which a sound wave propagates.

The imaging device 11 includes a first camera 31. Examples of the first camera 31 include cameras including an image sensor, such as a digital camera and a high speed camera. The image sensor is, for example, a charge-coupled device (CCD) or complementary metal-oxide-semiconductor (CMOS) image sensor with a known pixel pitch. The image sensor converts a picture which is formed on the image sensor into an electric signal as picture data.

The first camera 31 has a first optical axis OA1. The first optical axis OA1 is an example of a first optical axis and an optical axis of the imaging device. The first optical axis OA1 is a virtual straight line that passes through the axis of a lens of the first camera 31 and extends outward from the first camera 31. When the axis of the lens is orthogonal to an imaging face of the first camera 31, the optical-axis OA1 is a straight line orthogonal to the imaging face of the first camera 31, accordingly. Note that, in the present embodiment, it is defined that, when light on the first optical-axis OA1 is deflected by reflection, the first optical-axis OA1 is similarly refracted. In other words, the first optical-axis OA1 indicates the center of the shooting range of the first camera 31.

In the present embodiment, the first optical-axis OA1 extends horizontally. Note that the first optical-axis OA1 is not limited to this example. The first camera 31 is arranged so that the first optical-axis OA1 passes through the background device 12, the filter 14, and the substance S.

As illustrated in the drawings, in the present specification, an X-axis, a Y-axis, and a Z-axis are defined. The X-axis, the Y-axis, and the Z-axis are orthogonal to each other. The X-axis is in the first optical-axis OA1. The Y-axis is in a horizontal direction orthogonal to the first optical-axis OA1. The Z-axis is in the vertical direction.

The background device 12 includes a background member 35, a diffusion plate 36, and a light source 37. The background member 35 is, for example, a sheet made of paper or synthetic resin and allowing transmission of light. The background member 35 has a front face 35a.

The front face 35a is approximately flat and approximately orthogonal to the first optical-axis OA1. The front face 35a faces the first camera 31. The front face 35a is provided with a pattern 39. In other words, the background member 35 displays the pattern 39. The pattern 39 is an example of background images. The background member 35 is arranged so that at least part of the pattern 39 is within the shooting range of the first camera 31.

The pattern 39 as an example of background images is a random dot pattern, for example. The pattern 39 is not limited to this example, and examples of the pattern 39 may include various images, such as dots arranged in gridlike fashion, dots arranged in zigzag fashion, a striped pattern, a figure, an illustration, and a photograph. The background device 12 may be omitted, and instead, a scenery may be made use of as a background image for measurement. The background member 35 may be a metal sheet provided with a plurality of holes. In this case, the holes constitute the pattern 39.

The pattern 39 is a pattern (a background image) the movement of which can be identified by the imaging device 11. For example, when the pattern 39 with randomly arranged dots is photographed by the first camera 31, the distance between the dots in a photographed picture is larger than 1 pixel and smaller than the whole width of the picture.

The diffusion plate 36 is attached to a face opposite to the front face 35a of the background member 35. The light source 37 is a light emitting diode (LED), for example. Note that the light sources 37 may be another type of light source, and may be natural light. The light source 37 irradiates the diffusion plate 36 with light L1. The light L1 emitted from the light source 37 is turned into a diffused light by the diffusion plate 36, and passes through the background member 35. Accordingly, light L2 is emitted from the background member 35 toward the first camera 31. Since the light L2 is a diffused light, an influence of the incident angle of the light L2 entering into the first camera 31 is reduced.

The light source 37 may irradiate the pattern 39 of the background member 35 with the light L1. In this case, the light L1 is reflected by the background member 35, so that the light L2 is emitted from the background member 35 toward the first camera 31. Alternatively, the background member 35 may generate and emit light, so that the light L2 is emitted from the background member 35 toward the first camera 31.

By photographing the pattern 39 with the first camera 31, an emission point of the light L2 emitted from the background member 35 can be located. In other words, based on a position of the pattern 39 in a picture photographed by the first camera 31, an emission point of the light L2 viewed from the first camera 31 can be located. Thus, the light L2 is an example of light of a background image.

The holder 13 is arranged between the imaging device 11 and the background device 12. The holder 13 holds a substance S at a position at which the first optical-axis OA1 passes through the substance S. Note that, for example, in the case where the substance S is gas, the holder 13 may be omitted.

The filter 14 is arranged between the first camera 31 and the substance S on the first optical-axis OA1. The filter 14 may include a cut filter or a polarizing plate, depending on the substance S, for example. The filter 14 may be omitted. For example, the measurement apparatus 10 includes, as the filter 14, a cut filter that intercepts light generated from the substance S and the surrounding light.

For example, in order to measure a difference in temperature in a space for processing such as laser beam machining or welding, the measurement apparatus 10 can measure the refractive index gradient of gas, as the substance S, in the space. In this case, the measurement apparatus 10 may include the filter 14 that is a cut filter that intercepts light generated by the processing.

Furthermore, for example, in order to measure a stress generated in a substance S in a predetermined direction, the measurement apparatus 10 can measures the refractive index gradient of the substance S. In this case, the measurement apparatus 10 may include, as the filter 14, a polarizing plate that allows the transmission of light in accordance with the direction of the stress to be measured.

Each of the first moving device 15, the second moving device 16, and the third moving device 17 is, for example, an automatically operated or hand-operated stage. Note that the measurement apparatus 10 includes at least one of the first moving device 15, the second moving device 16, and the third moving devices 17.

The first moving device 15 can move the first camera 31 in a direction orthogonal to the first optical-axis OA1 with respect to the substance S and the pattern 39. In the present specification, the direction orthogonal to the first optical-axis OA1 is referred as an axis-orthogonal direction. The axis-orthogonal direction is, for example, the Y-axis direction (horizontal direction), the Z-axis direction (vertical direction), or a combination of the Y-axis direction and the Z-axis direction.

The second moving device 16 can move the background device 12 in the axis-orthogonal direction. Thus, the second moving device 16 moves the pattern 39 in the axis-orthogonal direction with respect to the first camera 31 and the substance S.

The third moving device 17 can move the holder 13 in the axis-orthogonal direction. Thus, the third moving device 17 moves the substance S in the axis-orthogonal direction with respect to the first camera 31 and the pattern 39.

The output device 21 is a display device such as a liquid crystal display (LCD), for example. The output device 21 is capable of displaying, for example, a picture photographed by the first camera 31 and various types of information. The input device 22 is a device for doing input, such as a keyboard or a mouse, for example. The output device 21 and the input device 22 are not limited to the above-mentioned examples.

Figure 2:
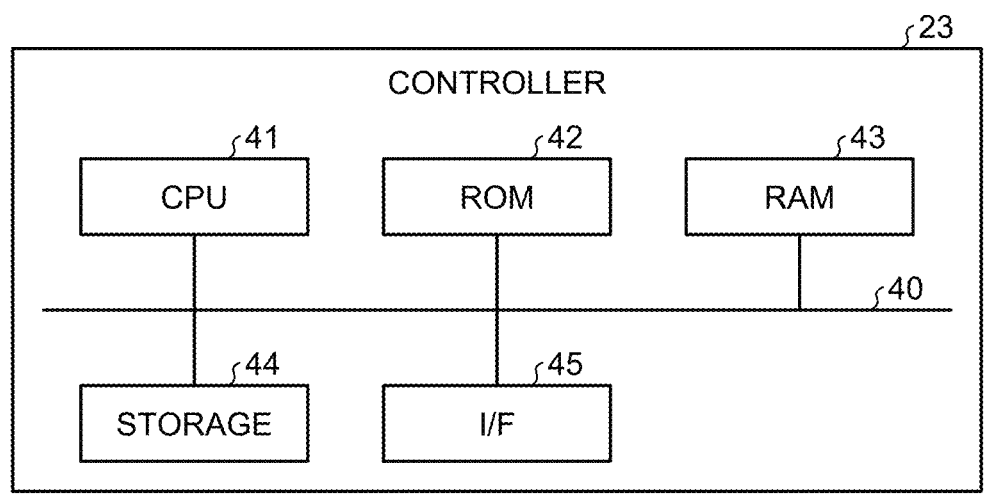
FIG. 2 is an exemplary schematic block diagram of a configuration example of a controller in the first embodiment.

FIG. 2 is a schematic block diagram of a configuration example of the controller 23 in the first embodiment. As illustrated in FIG. 2, the controller 23 includes a central processing unit (CPU) 41, a read-only memory (ROM) 42, a random-access memory (RAM) 43, a storage 44, and an interface (I/F) 45 that are connected to each other via a bus 40. The storage 44 is a device where information is storable, changeable, and deletable, such as a hard disk drive (HDD) or a solid state drive (SSD).

The controller 23 is electrically connected to the first moving device 15, the second moving device 16, the third moving device 17, the output device 21, the input device 22, and the first camera 31 via the interface 45, for example.

Figure 3:
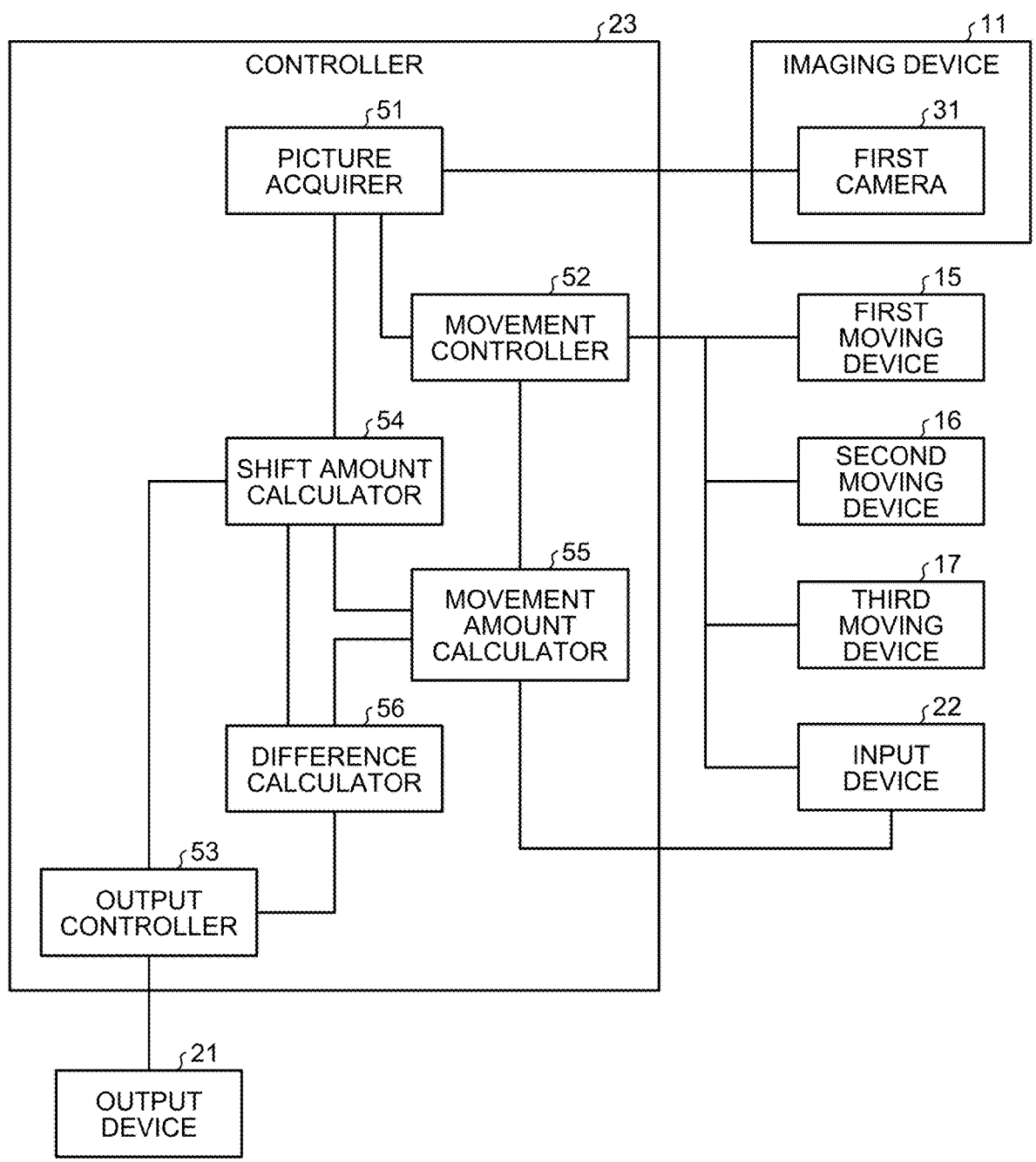
FIG. 3 is an exemplary functional block diagram illustrating the configuration of the controller in the first embodiment.

FIG. 3 is a functional block diagram illustrating a configuration of the controller 23 in the first embodiment. As illustrated in FIG. 3, the controller 23 includes a picture acquirer 51, a movement controller 52, an output controller 53, a shift amount calculator 54, a movement amount calculator 55, and a difference calculator 56. The shift amount calculator 54 is an example of a first displacement calculator. The movement amount calculator 55 is an example of a second displacement calculator. The difference calculator 56 is an example of a third displacement calculator.

In the controller 23, for example, the CPU 41 reads and executes a computer program from the ROM 42 or the storage 44 to implement the elements illustrated in FIG. 3. The elements illustrated in FIG. 3 are exemplary functions of the controller 23. The elements illustrated in FIG. 3 are implemented by the CPU 41 or hardware including the CPU 41, for example.

The picture acquirer 51 controls the imaging device 11. In the present embodiment, the picture acquirer 51 controls the first camera 31 and acquires picture data on a picture photographed by the first camera 31.

The movement controller 52 controls the first moving device 15, the second moving device 16, and the third moving device 17. For example, by inputting a predetermined command value into the first moving device 15, the second moving device 16, or the third moving device 17, the movement controller 52 moves the first camera 31, the background device 12, or the holder 13. Note that the first moving device 15, the second moving device 16, and the third moving device 17 may be hand-operated.

The output controller 53 controls the output device 21. For example, the output controller 53 is capable of displaying a picture photographed by the first camera 31 on the output device 21. Furthermore, the output controller 53 is capable of displaying a result of measurement with the measurement apparatus 10 on the output device 21.

Hereinafter, an example of a method of measurement with the measurement apparatus 10 and examples of functions of the shift amount calculator 54, the movement amount calculator 55, and the difference calculator 56 in the measurement will be described. Note that the method of the measurement with the measurement apparatus 10 is not limited to examples described below.

First, a substance S is held by the holder 13. The substance S is arranged on the first optical-axis OA1 of the first camera 31. Note that, in a case that the substance S is gas, for example, the substance S is generated on the first optical-axis OA1, or a refractive index gradient in the substance S is created on the first optical-axis OA1.

Next, the picture acquirer 51 causes the first camera 31 to generate and acquire a picture P1 of the substance S. The picture P1 is an example of one of two pictures, that is, an example of a first picture. The picture acquirer 51 acquires data on the picture P1 from the first camera 31.

Next, the movement controller 52 causes the second moving device 16 to move a background image (pattern 39) of the background device 12, for example. Note that the movement controller 52 may cause the first moving device 15 to move the first camera 31, and/or may cause the third moving device 17 to move the holder 13.

After the background device 12 is moved, the picture acquirer 51 causes the first camera 31 to generate and acquire a picture P2 of the substance S. The picture P2 is an example of the other of the two pictures, that is, an example of a second picture. The picture acquirer 51 acquires data on the picture P2 from the first camera 31.

The pictures P1 and P2 are still images, for example. The pictures P1 and P2 may be moving images. The pictures P1 and P2 are information including at least one of the in-plane distribution of light intensity, the in-plane distribution of light wavelength, and the in-plane distribution of polarization of light, in a plane intersecting with the first optical-axis OA1.

The background device 12 is moved during the time after acquirement of the picture P1 and before acquirement of the picture P2. Because of this, the pattern 39 is located in different positions in the axis-orthogonal direction at the time of acquiring the picture P1 and the picture P2. That is, the pattern 39 differs in position in the axis-orthogonal direction at the time of acquiring the picture P1 and the picture P2. Specifically, in the present embodiment the position of the pattern 39 refers to position of pixel or feature point of the pattern 39.

The substance S may be moved during the time after acquirement of the picture P1 and before acquirement of the picture P2, so that the substance S is located in different positions in the axis-orthogonal direction at the time of acquiring the picture P1 and the picture P2. Alternatively, the first camera 31 may be moved during the time after acquirement of the picture P1 and before acquirement of the picture P2, so that the picture P1 and the picture P2 are formed at different imaging positions in the first camera 31, in the axis-orthogonal direction. Specifically, in the present embodiment the imaging position refers to a position of a photodiode on the image sensor of the first camera 31 for generating each of the pictures P1 and P2. In other words, between the picture P1 as a first picture and the picture P2 as a second picture, relative position (positional relation) between the substance S and the pattern 39 serving as a background image differ in a direction orthogonal to the optical axis along which the pictures are acquired. That is, between the pictures P1 and P2, relative position between the substance S and the pattern 39 differ in planes of the picture P1 and the picture P2.

Figure 4:
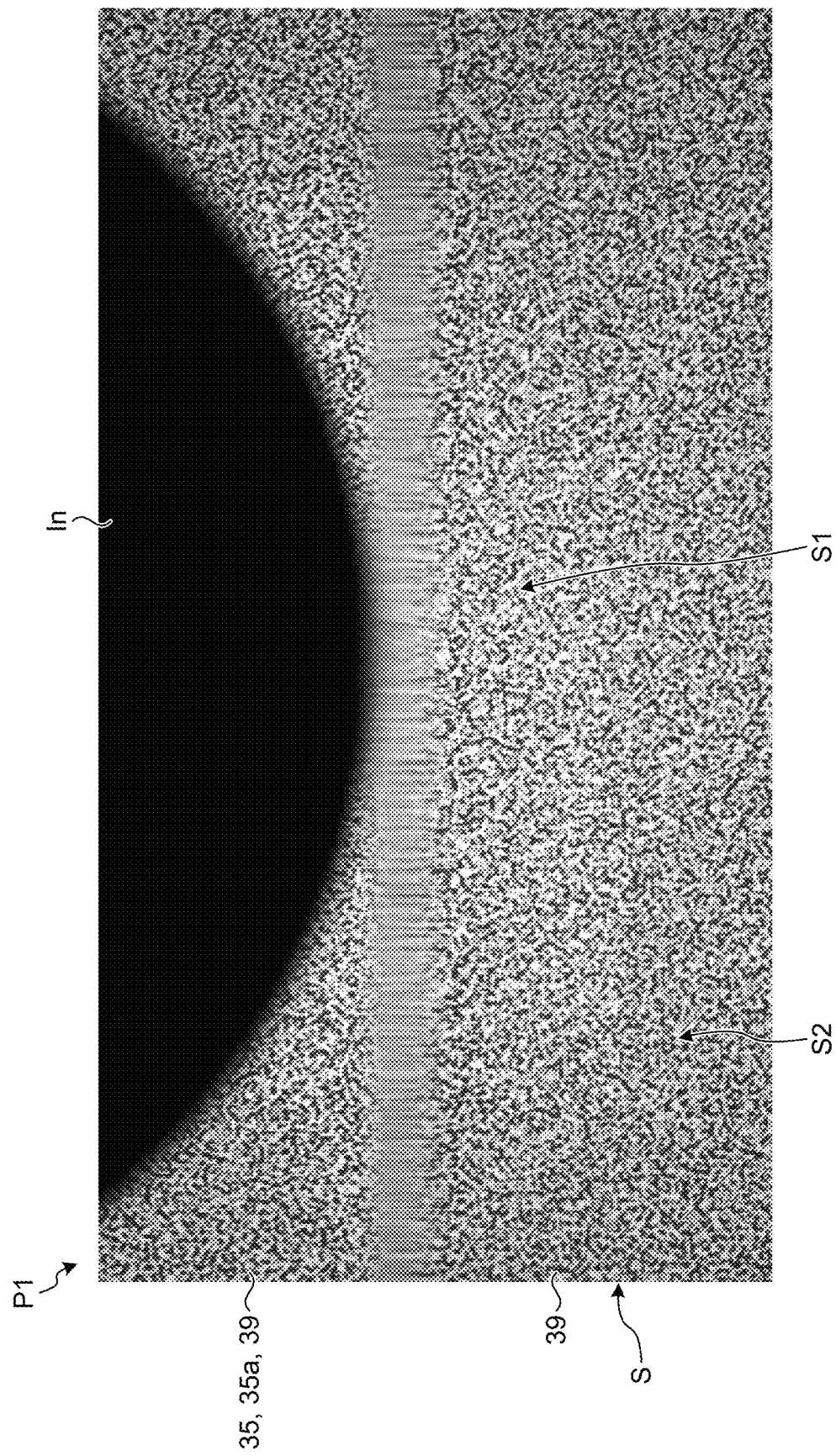
FIG. 4 is an exemplary diagram of an example of one picture in the first embodiment.
Figure 5:
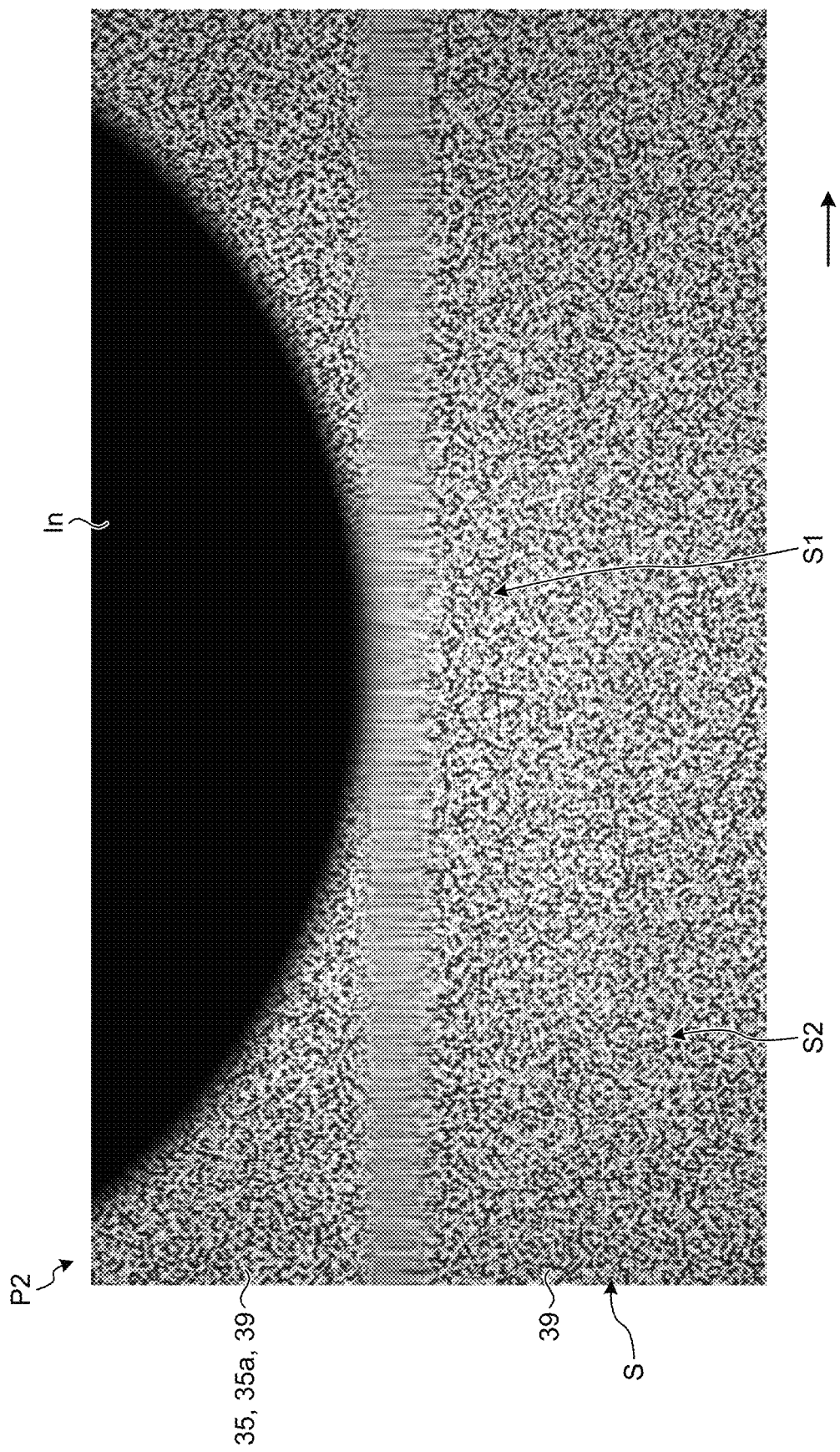
FIG. 5 is an exemplary diagram of an example of the other picture in the first embodiment.

FIG. 4 is a diagram of an example of the picture P1 in the first embodiment. FIG. 5 is a diagram of an example of the picture P2 in the first embodiment. The distance between the pattern 39 and the substance S at the time of acquisition of the pictures P1 and P2 in examples illustrated in FIG. 4 and FIG. 5 is set at 150 mm, and the distance between the first camera 31 and the substance S is set at 365 mm. Furthermore, the image sensor of the first camera 31 has a 2.41-µm-pixel pitch and a size of 13.2 mm×8.8 mm. Note that conditions for acquiring the pictures P1 and P2 are not limited to the above-mentioned examples.

In the examples illustrated in FIG. 4 and FIG. 5, the first camera 31 photographs an acrylic board as the substance S, the pattern 39 as a background, and an indenter In that presses the substance S. Thus, each of the pictures P1 and P2 includes the substance S and the pattern 39 as a background. In other words, at the time of acquiring each of the pictures P1 and P2, the substance S and the pattern 39 are located within the shooting range of the first camera 31. Only the substance S may be located within the shooting range of the first camera 31.

When the indenter In presses the substance S, an uneven distribution of stress and an uneven distribution of density are caused in the substance S. A refractive index is dependent on density, and accordingly a refractive index gradient is caused in the substance S. For example, in the substance S, a refractive index in a portion S1 in the vicinity of a compression point pressed by the indenter In changes, and accordingly, a refractive index gradient is caused in the substance S. For example, the distribution of stress and the distribution of density in the substance S can be calculated from the refractive index gradient of the substance S.

The light L2 emitted from the background member 35 can pass through the substance S. Therefore, as illustrated in FIG. 4 and FIG. 5, each of the pictures P1 and P2 includes the pattern 39 visible through the substance S. In other words, in the pictures P1 and P2, the pattern 39 is viewable through the substance S.

After the background device 12 is moved by approximately 10 µm in the Y-axis direction (horizontal direction) from a position at the time of acquisition of the picture P1, the first camera 31 acquires the picture P2. Thus, as a whole, the pattern 39 in the picture P2 is in a position translated by approximately 2 or 3 pixels from a position of the pattern 39 in the picture P1. Note that the movement amount of the pattern 39 between the pictures P1 and P2 is not limited to the above-mentioned examples. For example, approximately 0.5 pixel or more movement is enough for detection.

Figure 6:
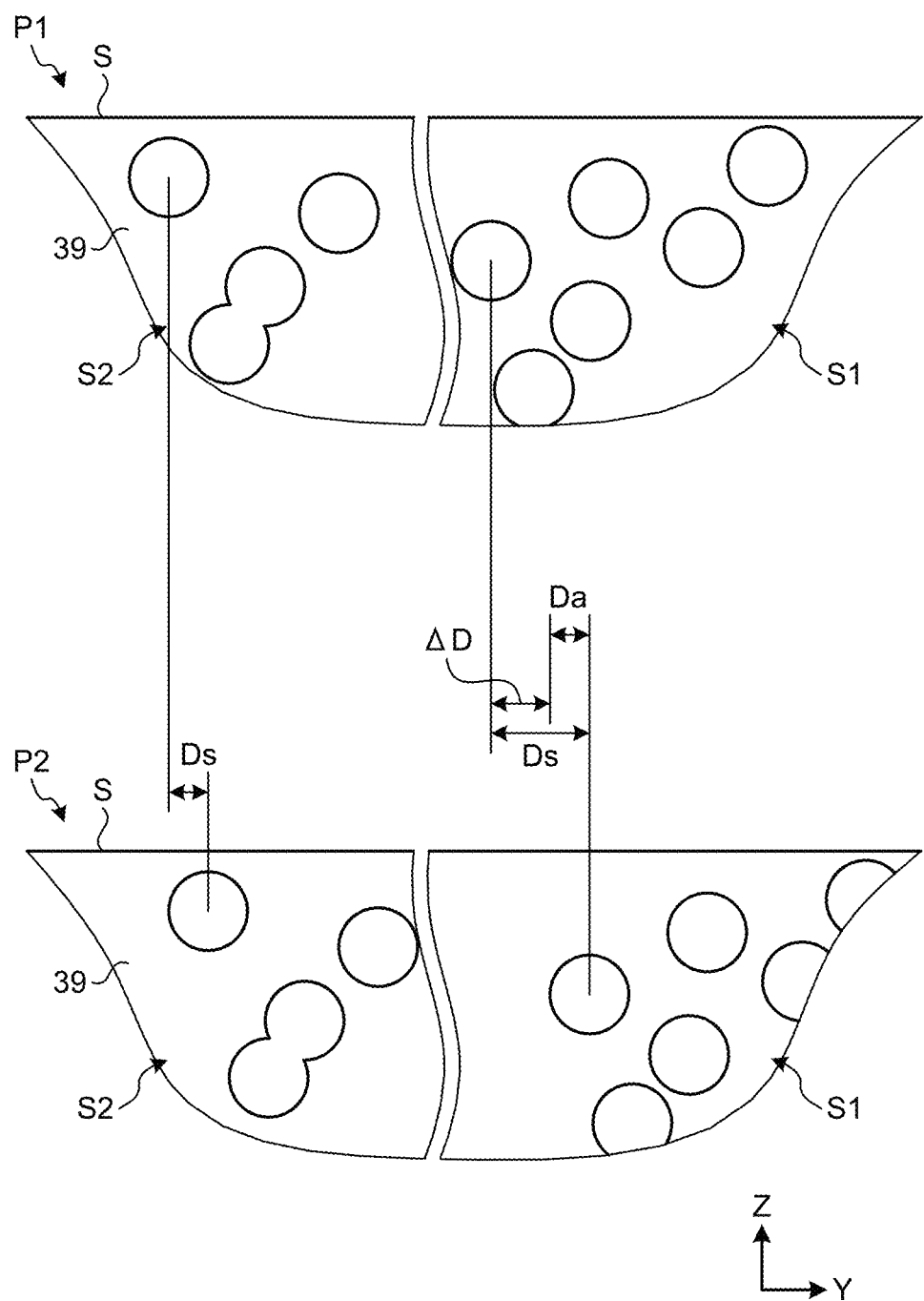
FIG. 6 is an exemplary schematic diagram illustrating a part of the one picture and a part of the other picture in the first embodiment.

FIG. 6 is a schematic diagram illustrating a part of the picture P1 and a part of the picture P2 in the first embodiment. Next, the shift amount calculator 54 calculates a shift amount Ds representing a difference between the picture P1 and the picture P2 in the positions of the pattern 39 visible through the substance S. The shift amount Ds is an example of a first displacement amount. The shift amount calculator 54 calculates the shift amount Ds of all or part of pixels or a plurality of feature points of the pictures P1 and P2, for example.

The shift amount calculator 54 calculates the shift amount Ds in the Y-axis direction (horizontal direction) between the two pictures P1 and P2 by optical flow processing, for example. The movement amount of the background device 12 between the time of acquisition of the picture P1 and the time of acquisition of the picture P2 is set within a traceable range in the optical flow processing. Note that the shift amount calculator 54 may calculate the shift amount Ds by another processing.

Figure 7:
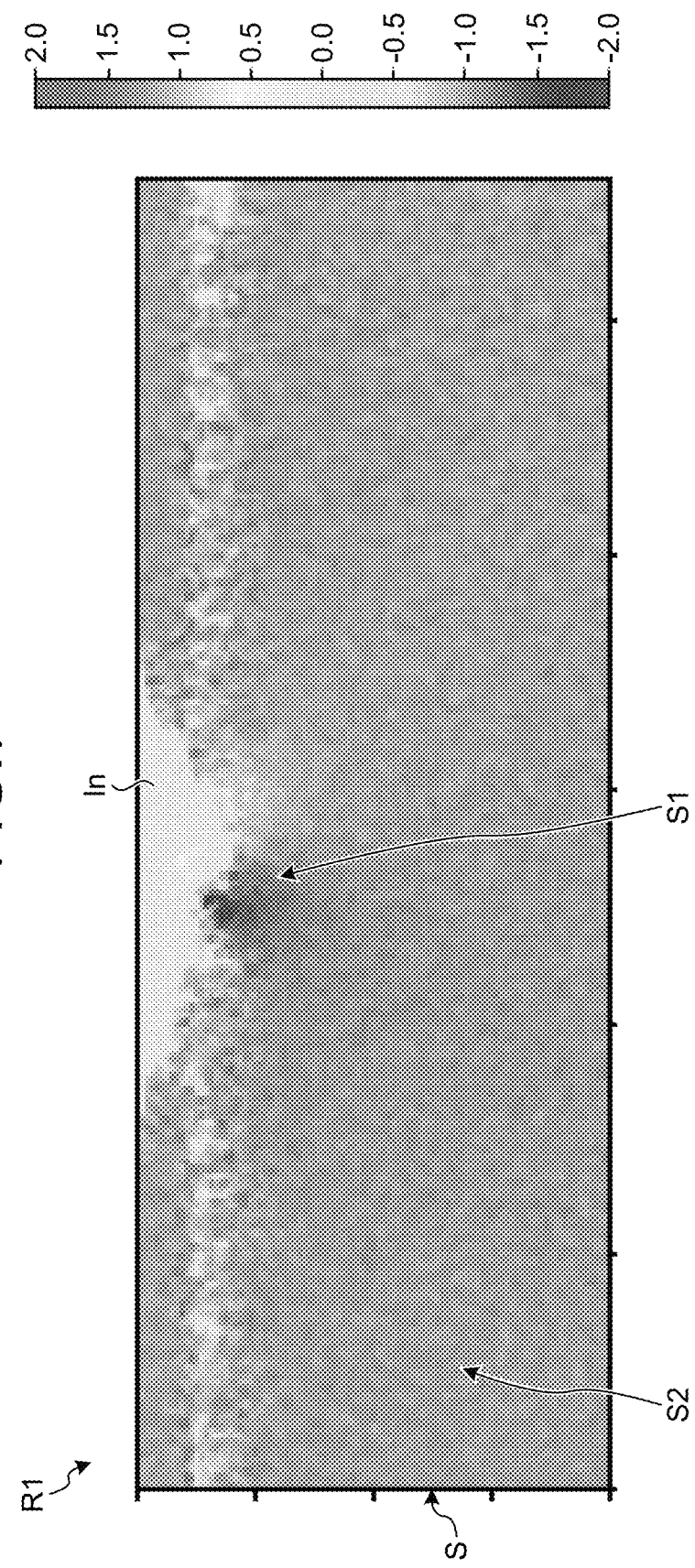
FIG. 7 is an exemplary diagram illustrating an example of results of the calculation of a shift amount in the first embodiment.

FIG. 7 is a diagram illustrating an example of a calculation result R1 on the shift amount Ds in the first embodiment. The shift amount calculator 54 may output the calculation result R1 on the shift amount Ds, in the form of a picture, such as FIG. 7, by which humans can sense the distribution of the shift amount Ds, a graph, or a table. The output controller 53 causes the output device 21 to output the calculation result R1. In the example of FIG. 7, the calculation result R1 shows the distribution of the shift amount Ds in terms of an amount of pixels. However, the calculation result R1 may show the distribution of the shift amount Ds in terms of another physical quantity. As illustrated in FIG. 7, in this example, approximately 1 pixel movement is observed on the whole.

Typically, light, when passing through a field with a refractive index gradient, is deflected and bent by refraction. That is, a refractive index gradient causes light to deflect or refract and occurs an angle of deviation (an angle of refraction). For example, light, when passing through an unevenly refractive substance having a refractive index gradient, is deflected by refraction in a direction of a higher refractive index. Thus, in the case of using the substance S with a refractive index gradient, the pattern 39 appears distorted through the substance S (schlieren phenomenon).

As described above, in the examples of FIG. 4 and FIG. 5, a refractive index gradient occurs in the portion S1 of the substance S in the vicinity of a compression point. Hence, as illustrated in FIG. 6, in the substance S, a shift amount Ds differs between the portion S1 in the vicinity of the compression point and a portion S2 with an approximately even refractive index distribution. The portion S2 is an example of a referential portion, and the refractive index distribution of the portion S2 is more uniform than that of the portion S1 in the vicinity of the compressing point.

Next, the movement amount calculator 55 calculates the movement amount Da of the pattern 39 during the time after acquirement of the picture P1 and before acquirement of the picture P2. The movement amount Da is an example of a second displacement amount. In the same manner as in the shift amount calculator 54, the movement amount calculator 55 calculates the movement amount Da of all or part of pixels or a plurality of feature points of the pictures P1 and P2, for example.

The movement amount Da refers to a difference between the pictures P1 and P2 in distance between the imaging positions at which the pictures P1 and P2 are generated and the positions of the pattern 39 in the axis-orthogonal direction. The difference between the pictures P1 and P2 is calculated as the number of pixels, for example. In the present embodiment, in terms of the calculation of the movement amount Da, the imaging positions at which the pictures P1 and P2 are generated match the positions of the first camera 31 generating the pictures P1 and P2. A referential portion (for example, the portion S2) such as a pattern, a mark, or a representative point is set in advance to the pattern 39 serving as a background image in a position with no uneven stress and density distribution and with a substantially even refractive index distribution and no refractive index gradient. The movement amount Da indicates how much the referential portion of the pattern 39 moves in the direction orthogonal to the optical axis between the picture P1 and the picture P2. In other words, the movement amount Da is a reference movement amount, i.e., the amount of movement of the referential part of the pattern 39 as a background image between the picture P1 and the picture P2.

In the present embodiment, the movement amount calculator 55 calculates the movement amount Da from a difference between the two pictures P1 and P2 in position of the pattern 39 visible through the portion S2 of the substance S. The portion S2 is an example of the referential portion. As described above, the refractive index distribution of the portion S2 is approximately even. Therefore, the difference in position of the pattern 39 seen through the portion S2 between the two pictures P1 and P2 is an amount of pixels reflecting the actual movement amount of a background image (pattern 39) of the background device 12, and is equal to approximately 2 or 3 pixels as described above.

The movement amount calculator 55 calculates the movement amount Da, for example, as an average of the shift amount Ds within a range, specified by an operator of the measurement apparatus 10, in the portion S2. Note that, without limiting to the above-described example, the movement amount calculator 55 may automatically determine the portion S2 using, for example, a neural network, and calculate the movement amount Da as an average of the shift amount Ds in the portion S2. Alternatively, the movement amount calculator 55 may calculate the movement amount Da, based on a command value inputted into the first moving device 15, the second moving device 16, or the third moving device 17 by the movement controller 52.

Figure 8:
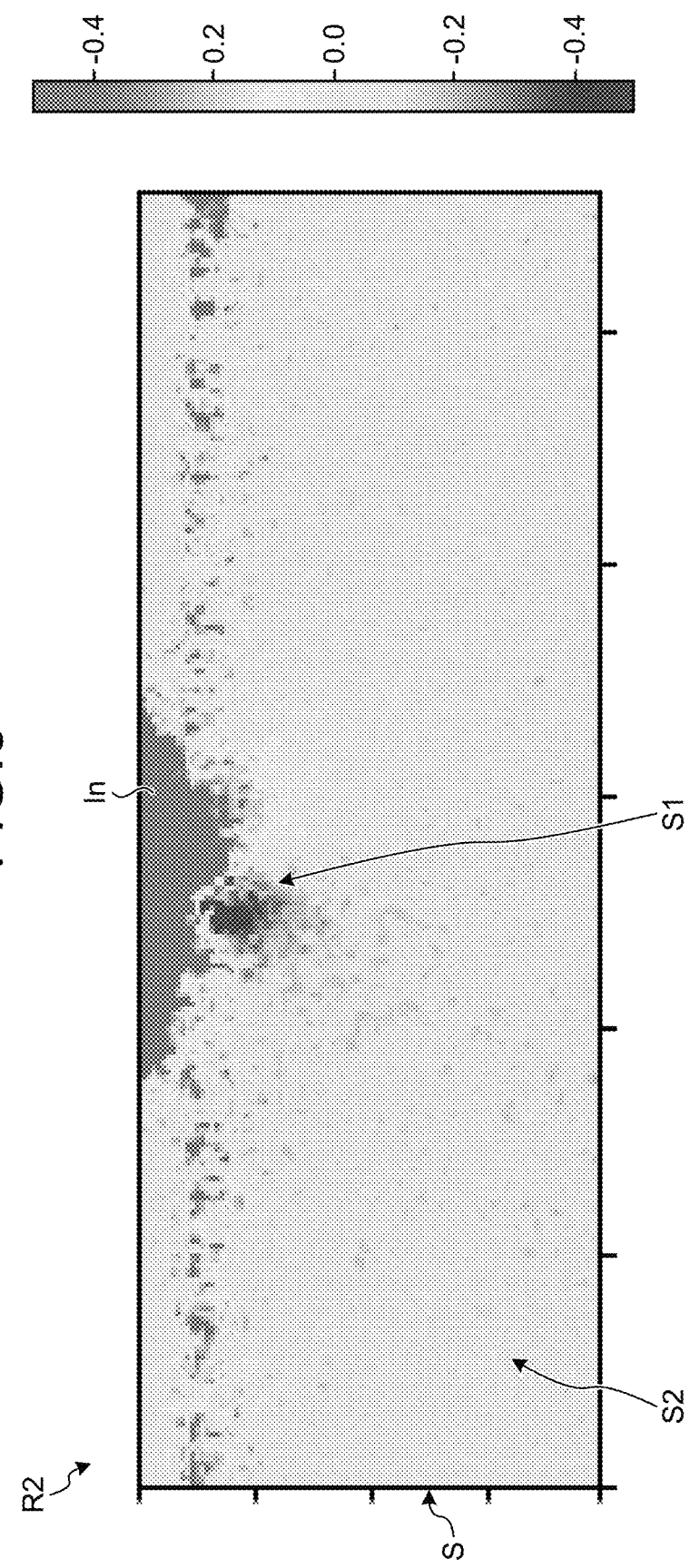
FIG. 8 is an exemplary diagram illustrating an example of result of the calculation of a difference in the first embodiment.

FIG. 8 is a diagram illustrating an example of a calculation result R2 of a difference ΔD in the first embodiment. The difference calculator 56 calculates a difference ΔD by subtracting the movement amount Da from the shift amount Ds. A difference ΔD in the portion S1 having a refractive index gradient indicates a difference in the shift amount Ds caused by the refractive index gradient. As illustrated in FIG. 8, a difference ΔD in the portion S2 with a substantially uniform refractive index is approximately 0.

The difference calculator 56 may output the calculation result R2 of the difference ΔD in the form of a picture, such as FIG. 8, by which humans can sense the distribution of difference ΔD, a graph, or a table. The output controller 53 causes the output device 21 to output the calculation result R2. In the example of FIG. 8, the calculation result R2 shows the distribution of difference ΔD in terms of an amount of pixels. However, the calculation result R2 may show the distribution of difference ΔD in terms of another physical quantity.

For example, a light deflection angle caused by a refractive index gradient can be calculated from a difference ΔD. Furthermore, the refractive index distribution of the substance S can be calculated from the light deflection angle. Furthermore, the distribution of density of the substance S and the distribution of stress in the substance S can be calculated from the refractive index distribution of the substance S.

As described above, the measurement apparatus 10 measures the distribution of the shift amount Ds and the distribution of the difference ΔD between the picture P1 and the picture P2. The measurement apparatus 10 can be used for calculation of the distribution of each of the light deflection angle, refractive index, density, and stress of the substance S.

According to the measurement apparatus 10 and the measurement method in first embodiment, each of the pictures P1 and P2 acquired by the imaging device 11 includes the pattern 39 visible through the substance S. In other words, the pictures P1 and P2 including the pattern 39 and the substance S through which the light from the pattern 39 is transmissible are acquired, and the picture P2 is different from the picture P1 in terms of positional relation between the pattern 39 and the substance S. Thus, the pattern 39, visible through the substance S is shifted in position in the pictures P1 and P2. Furthermore, the measurement apparatus 10 and the measurement method calculate the shift amount Ds representing a difference between the pictures P1 and P2 in position of the pattern 39 through the substance S. The substance S may have a refractive index gradient and exhibit a different refractive index depending on the position. In such a case the shift amount Ds varies depending on the position in the substance S. Hence, by measuring the shift amount Ds at each position in the substance S, the refractive index gradient of the substance S can be calculated.

For acquiring the two pictures P1 and P2 separately, the imaging positions at which the pictures P1 and P2 including the pattern 39 are formed in the imaging device 11, the positions of the substance S, and/or the positions of the pattern 39 mutually differ in the direction orthogonal to the first optical-axis OA1 of the imaging device 11. In other words, the imaging device 11 acquires the picture P1 and the picture P2 under different conditions in terms of at least one of the position at which the pattern 39 is formed, the position of the substance S, and the position of the pattern 39 in the direction orthogonal to the first optical-axis OA1. Thus, in the pictures P1 and P2 the pattern 39 appears through the substance S in shifted positions in the axis-orthogonal direction. This can avoid the shift amount Ds from being affected by a change in magnification caused by movement along the first optical-axis OA1, enabling more accurate calculation of the refractive index gradient of the substance S.

Typically, the refractive index gradient of the substance S can be calculated by background-oriented schlieren. However, in the background-oriented schlieren, a measurement image representing a background through the substance S and a reference image representing a background with the substance S removed are compared to find the refractive index gradient of the substance S. This may take time and labor for the removal and arrangement of the substance S. Furthermore, with the passage of time taken for the removal or arrangement of the substance S, the substance S and the background may change in position due to vibration or volume change caused by temperature at the time of acquiring the measurement image and at the time of acquiring the reference image, resulting in lowering the accuracy of the measurements.

In contrast, the measurement apparatus 10 and the measurement method of the present embodiment compare the pictures P1 and P2 depicting through the substance S the pattern 39, which has been moved in the axis-orthogonal direction, to be able to calculate the refractive index gradient of the substance S. This can exclude the arrangement or removal of the substance S, thereby facilitating the measurement of the substance S. Furthermore, the picture P1 and the picture P2 can be acquired at a shorter interval, reducing a decrease in the accuracy of measurements.

The measurement apparatus 10 and the measurement method calculate the movement amount Da representing a difference between the pictures P1 and P2 in distance between the imaging positions at which the pictures P1 and P2 are acquired, and the positions of the pattern 39 in the axis-orthogonal direction, and subtract the movement amount Da from the shift amount Ds. This makes it possible to calculate the difference ΔD reflecting the refractive index distribution of the substance S more accurately, with the influence of the movement amount Da removed. Thus, the refractive index gradient of the substance S can be more accurately calculated from the difference ΔD.

The movement amount Da is calculated from the difference between the pictures P1 and P2 in position of the referential portion (portion S2) of the pattern 39. In other words, the movement amount Da is calculated from the difference between the pictures P1 and P2 in position of the pattern 39 visible through the portion S2 of the substance S. The portion S2 exhibits a more gradual refractive index distribution than the portion S1. With a uniform refractive index of the portion S2, for example, the movement amount Da, calculated from the difference between the pictures P1 and P2 in position of the pattern 39 visible through the portion S2, can substantially accurately reflect the actual movement amount Da. That is, it is possible to more accurately calculate the movement amount Da than, for example, calculating the movement amount Da in accordance with a command value for the second moving device 16.

During the time after acquirement of the picture P1 and before acquirement of the picture P2, the measurement apparatus 10 and the measurement method move the pattern 39 in the axis-orthogonal direction. This facilitates the acquirement of the pictures P1 and P2 and the measurement. The substance S or the imaging device 11 may be moved during the time after acquirement of the picture P1 and before acquirement of the picture P2.

Second Embodiment

Hereinafter, the second embodiment will be described with reference to FIG. 9 and FIG. 10. Note that, in descriptions about a plurality of embodiments below, constituents having the same functions as those of the already-described constituents are assigned with the same reference numerals as those for the above-described constituents, and furthermore, descriptions of the constituents are sometimes omitted. Furthermore, constituents having the same reference numeral does not necessarily share the same function and character, and may have different functions and characters in accordance with the embodiments.

Figure 9:
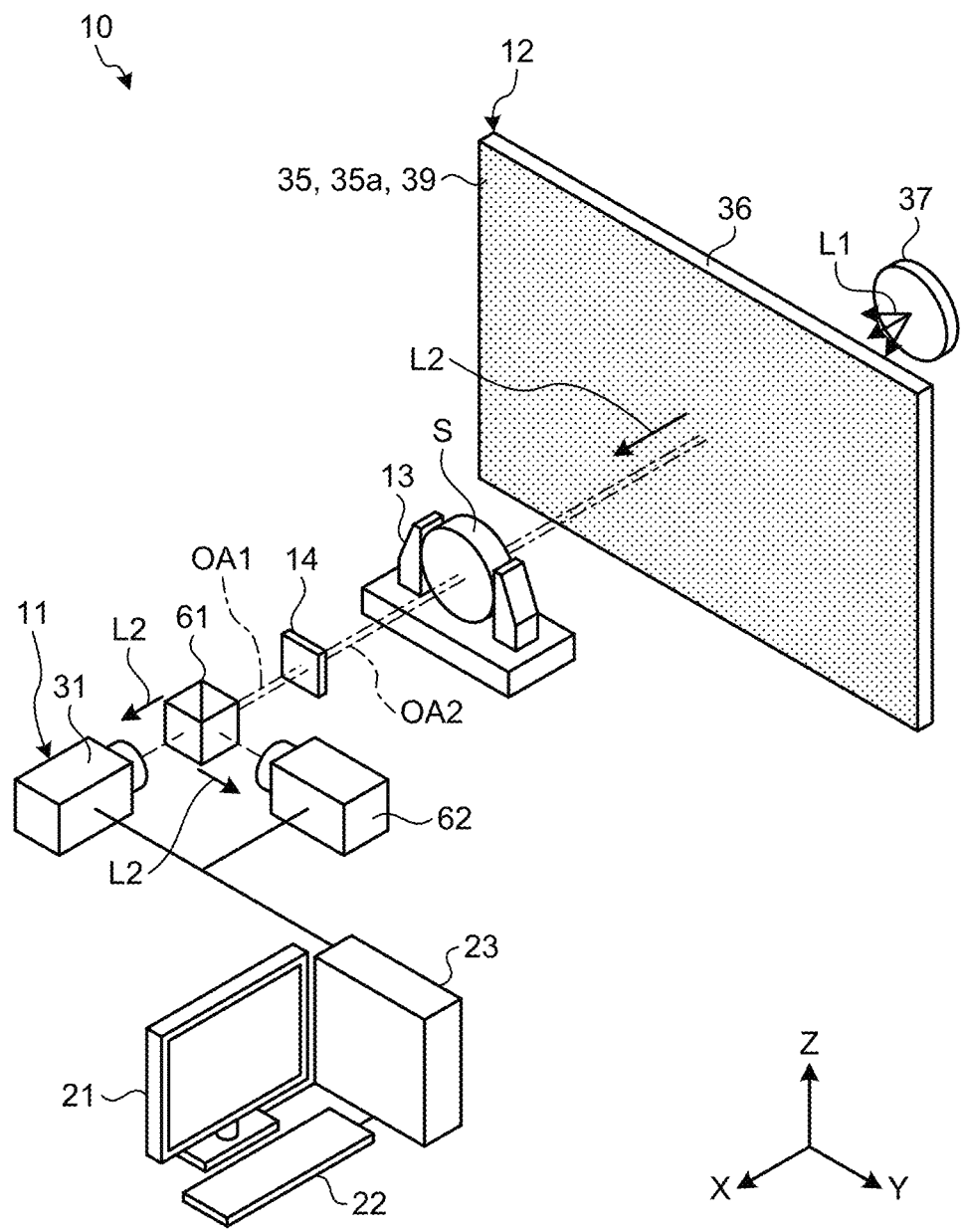
FIG. 9 is an exemplary perspective view schematically illustrating a measurement apparatus according to a second embodiment.

FIG. 9 is a perspective view schematically illustrating the measurement apparatus 10 according to the second embodiment. As illustrated in FIG. 9, the measurement apparatus 10 in the second embodiment further includes a beam splitter 61. The beam splitter 61 is disposed on the first optical-axis OA1 between the filter 14 and the first camera 31.

The beam splitter 61 is, for example, a half mirror. Traveling on and along the first optical-axis OA1, light passes through the beam splitter 61. The first optical-axis OA1 extends toward the pattern 39 through the beam splitter 61 and the substance S.

The imaging device 11 further includes a second camera 62. As with the first camera 31, the second camera 62 is, for example, a camera including an image sensor, such as a digital camera or a high speed camera. The image sensor of the second camera 62 is the same, for example, in pixel pitch and size as the image sensor of the first camera 31. Note that the image sensor of the second camera 62 may be different from the image sensor of the first camera 31.

The second camera 62 has a second optical-axis OA2. The second optical-axis OA2 is a virtual straight line connecting between the centers of lenses of the second camera 62 and extending to outside of the second camera 62. Note that, in the present embodiment, it is defined that, when light on the second optical-axis OA2 is deflected by reflection, the second optical-axis OA2 is similarly deflected. That is, the second optical-axis OA2 indicates the center of the shooting range of the second camera 62.

The beam splitter 61 is arranged on the second optical-axis OA2. Light on the second optical-axis OA2 is reflected by the beam splitter 61. Accordingly, the second optical-axis OA2 is bent at the beam splitter 61. The second optical-axis OA2 extends toward the pattern 39 via the beam splitter 61 and through the substance S. In other words, the beam splitter 61 arranged on the second optical-axis OA2 splits light along the optical axis between the imaging device 11 (the first camera 31 and the second camera 62) and the pattern 39.

The distance of an optical path between the first camera 31 and the pattern 39 is approximately equal to the distance of an optical path between the second camera 62 and the pattern 39. In other words, the total of a distance between the first camera 31 and the beam splitter 61 and a distance between the beam splitter 61 and the pattern 39 is approximately equal to the total of a distance between the second camera 62 and the beam splitter 61 and a distance between the beam splitter 61 and the pattern 39.

The first optical-axis OA1 is apart from the second optical-axis OA2 in the direction orthogonal to the first optical-axis OA1. For example, between the pattern 39 and the beam splitter 61, the first optical-axis OA1 extends in parallel with the second optical-axis OA2 and apart from the second optical-axis OA2 in the Y-axis direction (horizontal direction). Between the pattern 39 and the beam splitter 61, the first optical-axis OA1 may be apart from the second optical-axis OA2 in the Z-axis direction (the axis-orthogonal direction) or a combination of the Y-axis direction and the Z-axis direction.

Figure 10:
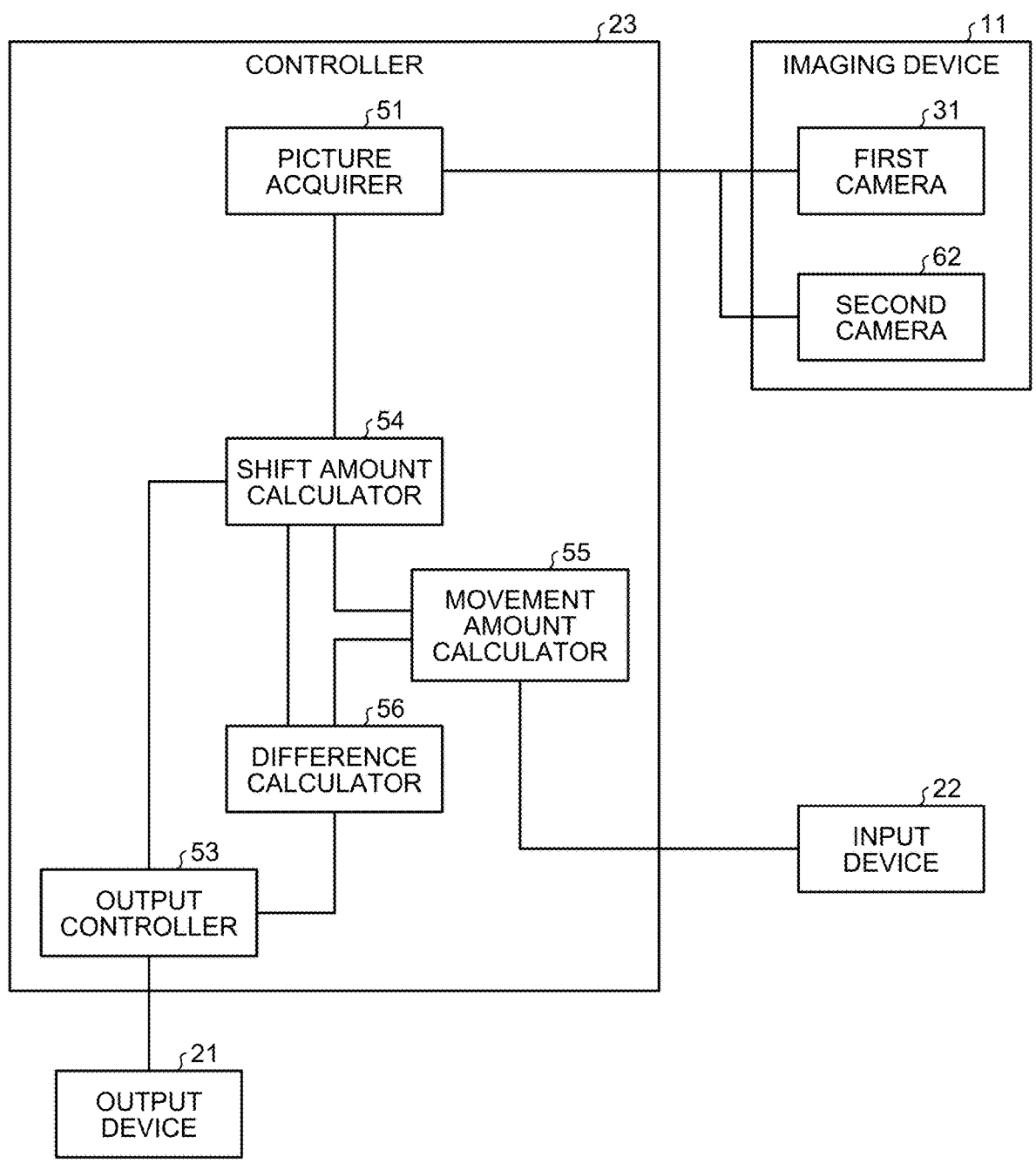
FIG. 10 is an exemplary functional block diagram illustrating a configuration example of a controller in the second embodiment.

FIG. 10 is a functional block diagram illustrating a configuration of the controller 23 in the second embodiment. As illustrated in FIG. 10, in the second embodiment, the picture acquirer 51 further controls the second camera 62. The picture acquirer 51 acquires picture data on a picture photographed by the second camera 62.

In the second embodiment, the first camera 31 generates and acquires the picture P1, and the second camera 62 generates and acquires the picture P2. The first camera 31 and the second camera 62 may generate the picture P1 and the picture P2 simultaneously or sequentially.

As described above, the first optical-axis OA1 is separated from the second optical-axis OA2 in the direction orthogonal to the first optical-axis OA1. Accordingly, an imaging position at which the picture P1 is formed in the first camera 31 in the axis-orthogonal direction at the time of acquisition of the picture P1 may be different from an imaging position at which the picture P2 is formed in the second camera 62 in the axis-orthogonal direction at the time of acquisition of the picture P2.

In the present embodiment, the first optical-axis OA1 is separated by approximately 10 μm from the second optical-axis OA2 in the direction orthogonal to the first optical-axis OA1. Thus, as a whole, a position of the pattern 39 in the picture P2 is moved in parallel by approximately 2 or 3 pixels from a position of the pattern 39 in the picture P1. Note that the movement amount of the pattern 39 between the pictures P1 and P2 is not limited to the above-mentioned example.

In the same manner as in the first embodiment, the shift amount calculator 54 calculates the shift amount Ds between the pictures P1 and P2, and the movement amount calculator 55 calculates the movement amount Da between the time of acquisition of the pictures P1 and P2.

In the present embodiment, the pattern 39 is standing still, so that the picture P1 and P2 can be simultaneously acquired. However, there is a difference in the pictures P1 and P2 between a distance in the axis-orthogonal direction between an imaging position of the picture P1 and the pattern 39 at the time of acquisition of the picture P1 and a distance in the axis-orthogonal direction between an imaging position of the picture P2 and the pattern 39 at the time of acquisition of the picture P2. Therefore, the movement amount Da can be calculated.

Furthermore, the difference calculator 56 calculates a difference ΔD. Thus, the distribution of light deflection angle, refractive index, density, and stress in the substance S can be calculated from the distribution of the shift amount Ds and the distribution of the difference ΔD.

According to the measurement apparatus 10 and the measurement method in the second embodiment, the beam splitter 61 is placed between the imaging device 11 and the patterns 39 for splitting light traveling along the optical axis therebetween. The imaging device 11 includes the first camera 31 having the first optical-axis OA1 extending toward the pattern 39 through the beam splitter 61 and the substance S, and the second camera 62 having the second optical-axis OA2 extending toward the pattern 39 via the beam splitter 61 and through the substance S. The first optical-axis OA1 is apart from the second optical-axis OA2 in the direction orthogonal to the first optical-axis OA1. The two pictures P1 and P2 are acquired by the first camera 31 and the second camera 62, respectively. This eliminates the necessity for moving the imaging device 11, the substance S, and the pattern 39, thereby facilitating the measurement. This further enables simultaneous acquirement of the two pictures P1 and P2, reducing a decrease in the accuracy of measurements, and enables accurate calculation of the refractive index gradient, at a specific moment, of the substance S moving as a thermal fluid.

The beam splitter 61 in the second embodiment splits light L2, emitted from the background member 35, into beams traveling toward the first camera 31 and the second camera 62. Alternatively, for example, the beam splitter 61 may split light on the first optical-axis OA1 of the first camera 31 so that the resulting split beams of light travel toward the two background members 35. In other words, the beam splitter 61 may split the first optical-axis OA1. In this case, positions of the patterns 39 in the two background members 35 with respect to the first optical-axis OA1 in the axis-orthogonal direction orthogonal to the first optical-axis OA1 are different from each other. For example, the imaging device 11 can acquire the two pictures P1 and P2 by interrupting light traveling toward one of the background members 35 by a shutter. Thus, in the case where the beam splitter 61 splits light on the first optical-axis OA1 of the first camera 31 so that the resulting split beams of light travel toward the two background members 35, it may be configured such that, light with a first wavelength is acquired for the pattern 39 in one of the two background members 35, and light with a second wavelength different from the first wavelength is acquired for the pattern 39 of the other of the two background members 35, so that, without using a shutter for interrupting light, the first picture P1 and the second picture P2 are simultaneously acquired using the first camera 31 only. Also in this case, the beam splitter 61 is configured to split light along the optical axis between the imaging device 11 and the pattern 39.

Third Embodiment

Figure 11:
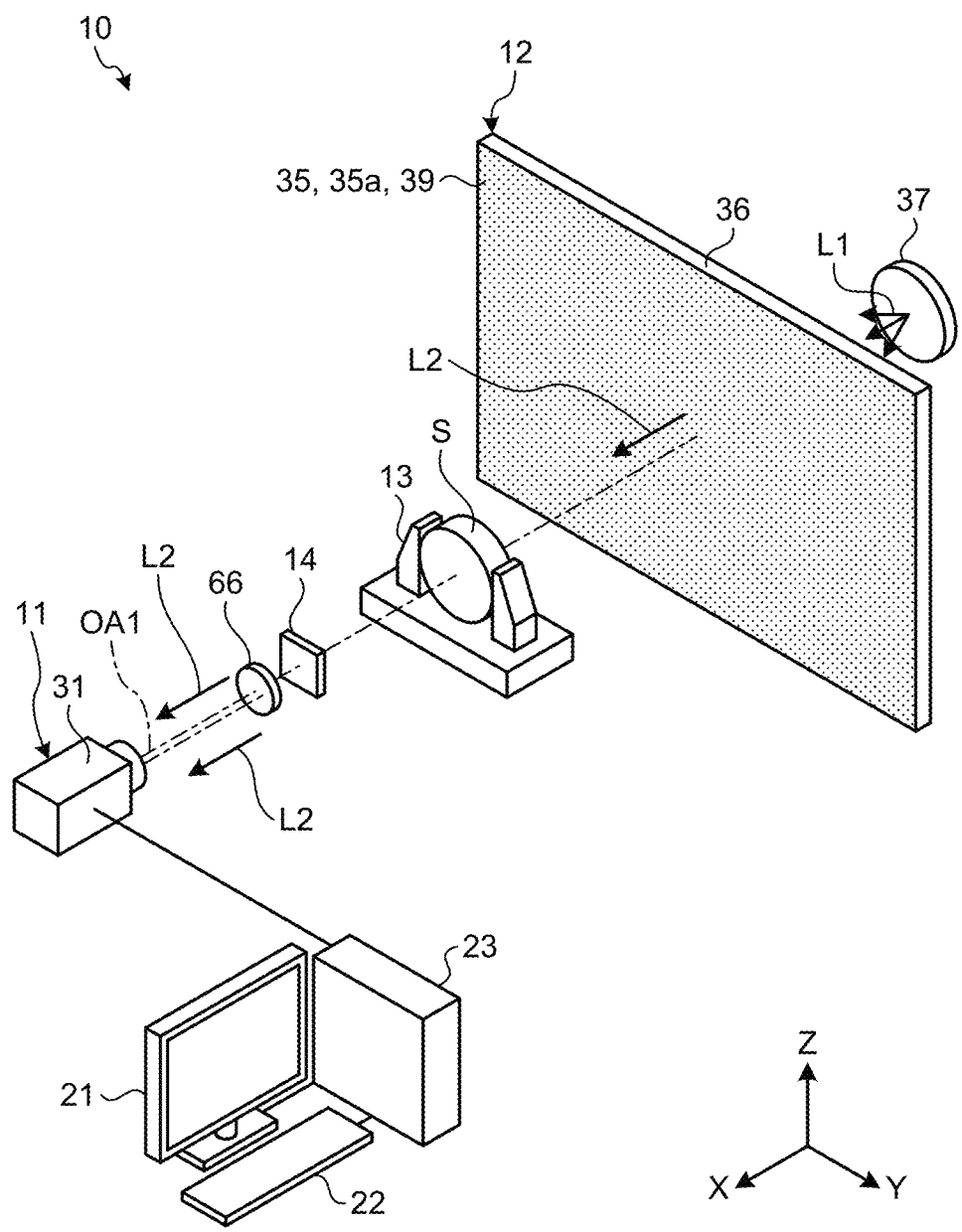
FIG. 11 is an exemplary perspective view schematically illustrating a measurement apparatus according to a third embodiment.

Hereinafter, a third embodiment will be described with reference to FIG. 11 and FIG. 12. FIG. 11 is a perspective view schematically illustrating the measurement apparatus 10 according to the third embodiment. As illustrated in FIG. 11, the measurement apparatus 10 in the third embodiment further includes a lens array 66. The lens array 66 is an example of an optical system.

The lens array 66 includes a plurality of lenses on one substrate, and is capable of dividing light in parallel. The measurement apparatus 10 may include another optical system capable of dividing light in parallel.

The lens array 66 is disposed on the first optical-axis OA1 between the filter 14 and the first camera 31. In other words, the first optical-axis OA1 extends toward the pattern 39 through the lens array 66 and the substance S. Therefore, the lens array 66 splits the light L2 on the first optical-axis OA1 (and light along the first optical-axis OA1) so that the resulting split beams of light L2 are parallel to each other.

The split beams of light L2 form images on different pixels of the image sensor of the first camera 31. Thus, the first camera 31 generates one picture including two pictures P1 and P2. In other words, the picture P1 is formed on part of the image sensor of the first camera 31, and the picture P2 is formed on another part of the image sensor of the first camera 31. Then, the first camera 31 acquires the pictures P1 and P2 formed on the image sensor. The picture acquired by the first camera 31 may include three or more pictures. In other words, the lens array 66 as an exemplary optical system is configured to split, into parallel beams, light traveling toward the imaging device 11 from the pattern 39 along the optical axis of the imaging device 11.

As described above, the light L2 is split by the lens array 66, so that, at the time of acquisition of the two pictures P1 and P2, imaging positions at which the pictures P1 and P2 are formed with the first camera 31 in the axis-orthogonal direction are different from each other. In the present embodiment, as a whole, a position of the pattern 39 in the picture P2 is moved in parallel by approximately 2 or 3 pixels from a position of the pattern 39 in the picture P1. Note that the movement amount of the pattern 39 between the pictures P1 and P2 is not limited to the above-described example.

Figure 12:
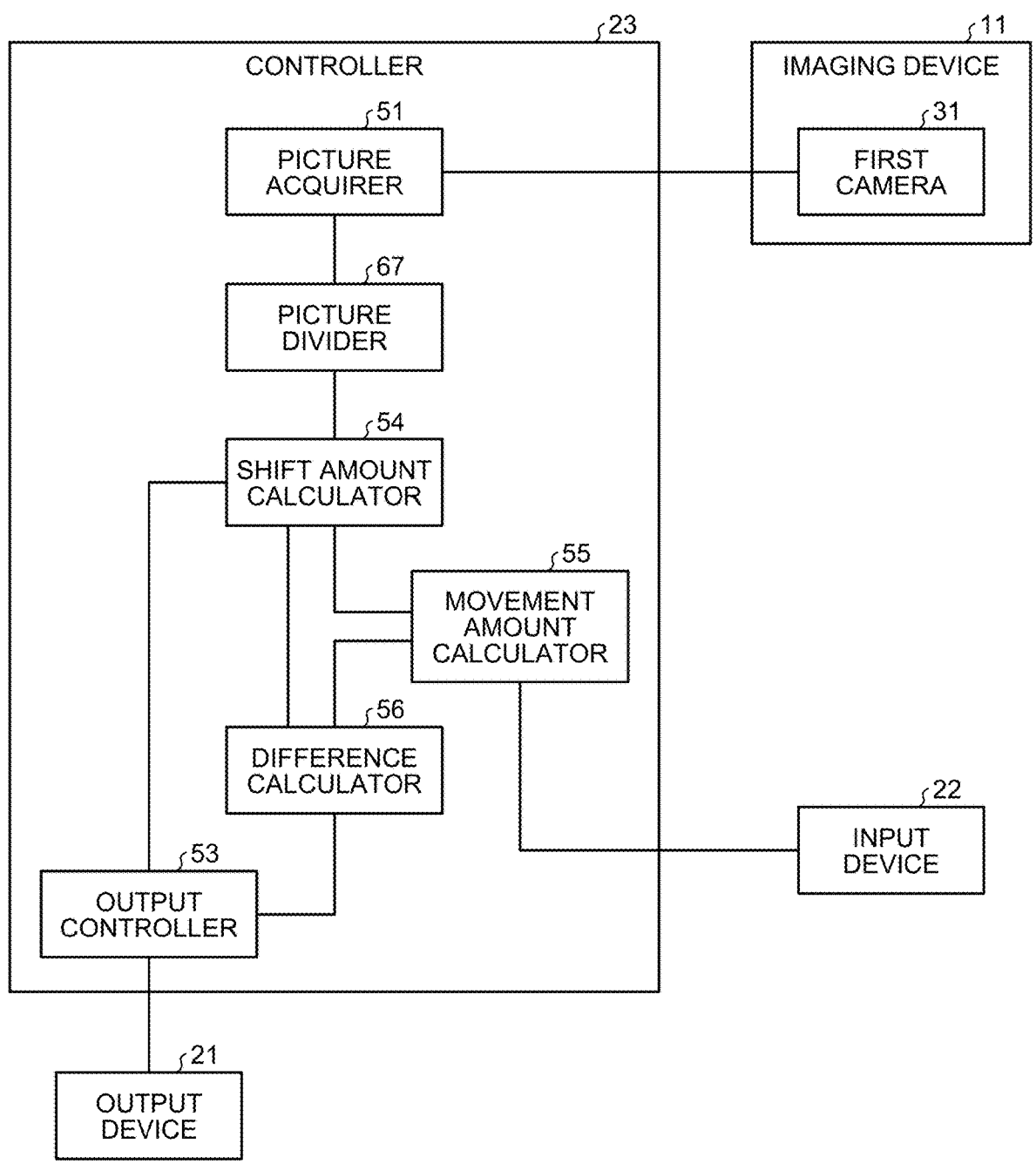
FIG. 12 is an exemplary functional block diagram illustrating a configuration of a controller in the third embodiment.

FIG. 12 is a functional block diagram illustrating a configuration of the controller 23 in the third embodiment. As illustrated in FIG. 12, in the third embodiment, the controller 23 further includes a picture divider 67. For example, the CPU 41 reads out and executes a computer program stored in the ROM 42 or the storage 44, so that the controller 23 implements the picture divider 67.

When the picture acquirer 51 acquires picture data on a picture photographed by the first camera 31, the picture divider 67 divides the picture into the picture P1 and the picture P2. In other words, the picture divider 67 extracts the two pictures P1 and P2 from the picture acquired by the first camera 31. Thus, the two pictures P1 and P2 are acquired from the picture acquired by the first camera 31

In the same manner as in the first embodiment, the shift amount calculator 54 calculates the shift amount Ds between the pictures P1 and P2, and the movement amount calculator 55 calculates the movement amount Da between the time of acquisition of the picture P1 and the time of acquisition of the picture P2.

In the present embodiment, the pattern 39 is stationary, and the pictures P1 and P2 can be simultaneously acquired. However, there is a difference in the pictures P1 and P2 between a distance in the axis-orthogonal direction between an imaging position of the picture P1 and the pattern 39 at the time of acquisition of the picture P1 and a distance in the axis-orthogonal direction between an imaging position of the picture P2 and the pattern 39 at the time of acquisition of the picture P2. Thus, the movement amount Da can be calculated.

Furthermore, the difference calculator 56 calculates a difference ΔD. Thus, the distribution of light deflection angle, refractive index, density, and stress in the substance S can be calculated from the distribution of the shift amount Ds and the distribution of the difference ΔD.

According to the measurement apparatus 10 and the measurement method in the third embodiment, the lens array 66 is placed between the imaging device 11 and the patterns 39 to split, into parallel beams, light traveling from the pattern 39 toward the imaging device 11 along the optical axis. The first optical-axis OA1 of the first camera 31 extends toward the pattern 39 through the substance S and the lens array 66 capable of splitting the light L2 into parallel beams. The two pictures P1 and P2 are formed at the two different parts of the first camera 31, and the first camera 31 acquires the two pictures P1 and P2 formed. Thereby, the imaging device 11, the substance S, and the pattern 39 are not to be moved, facilitating the measurement. Furthermore, the first camera 31 can simultaneously acquire the two pictures P1 and P2, which makes it possible to reduce a decrease in the accuracy of measurements, and more accurately calculate the refractive index gradient, at a specific moment, of the substance S moving as a thermal fluid.

Fourth Embodiment

Figure 13:
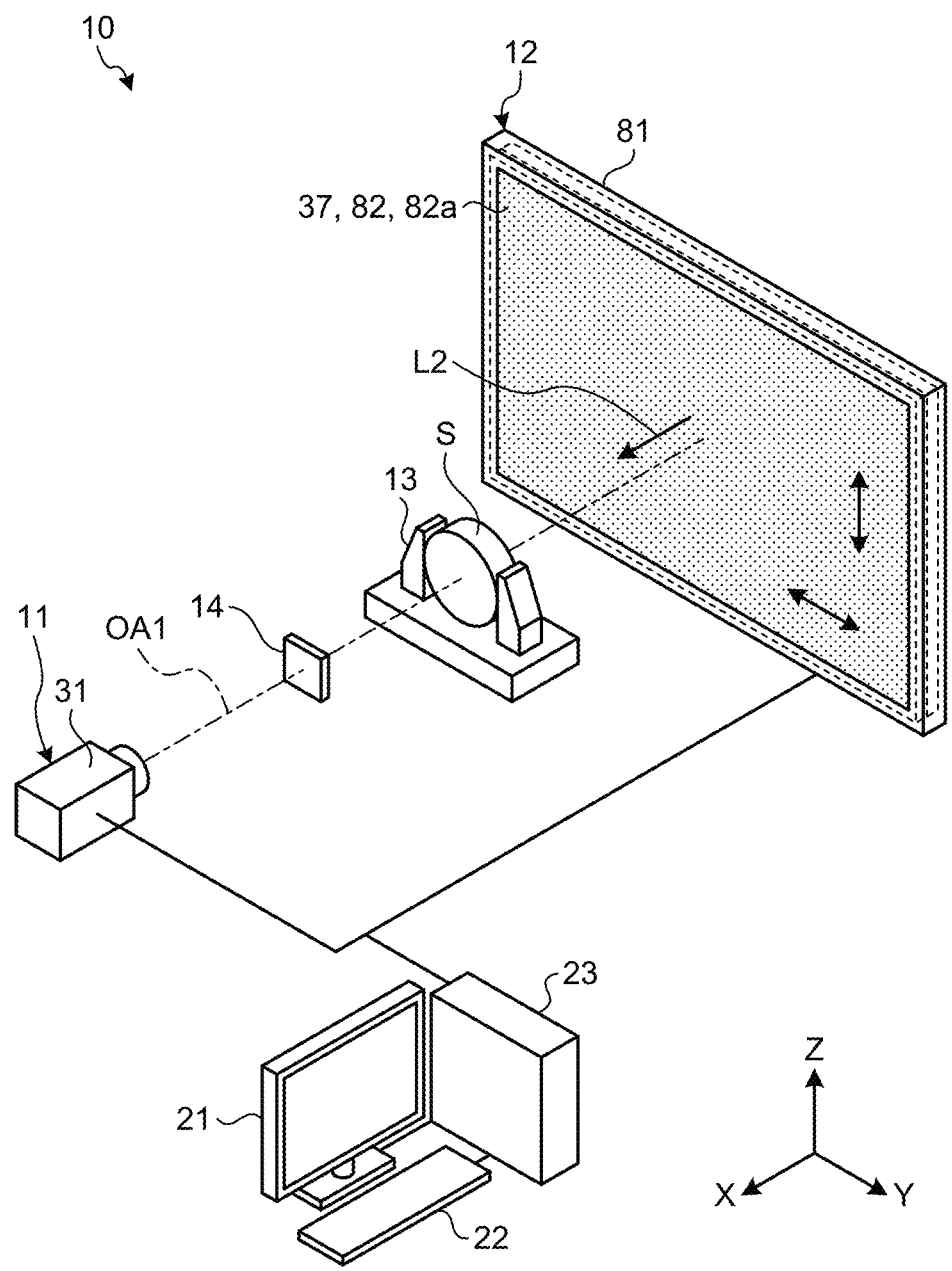
FIG. 13 is an exemplary perspective view schematically illustrating a measurement apparatus according to a fourth embodiment.

Hereinafter, the fourth embodiment will be described with reference to FIG. 13 and FIG. 14. FIG. 13 is a perspective view schematically illustrating the measurement apparatus 10 according to the fourth embodiment. As illustrated in FIG. 13, the background device 12 in the fourth embodiment includes a display device 81.

The display device 81 includes a display 82, for example. The display 82 is, for example, an LCD. The LCD includes a polarizing plate, a glass substrate, a liquid crystal, a diffusion plate, and a light source, for example. Note that the display 82 may be another display, such as an organic electroluminescence display (OLED) or a laser display. For example, in an OLED, an element emits light, and this makes a light source unnecessary. The display 82 includes a screen 82a capable of displaying a picture.

The first optical-axis OA1 extends toward the screen 82a through the substance S. The screen 82a is approximately flat, and approximately orthogonal to the first optical-axis OA1. The screen 82a faces the first camera 31.

Figure 14:
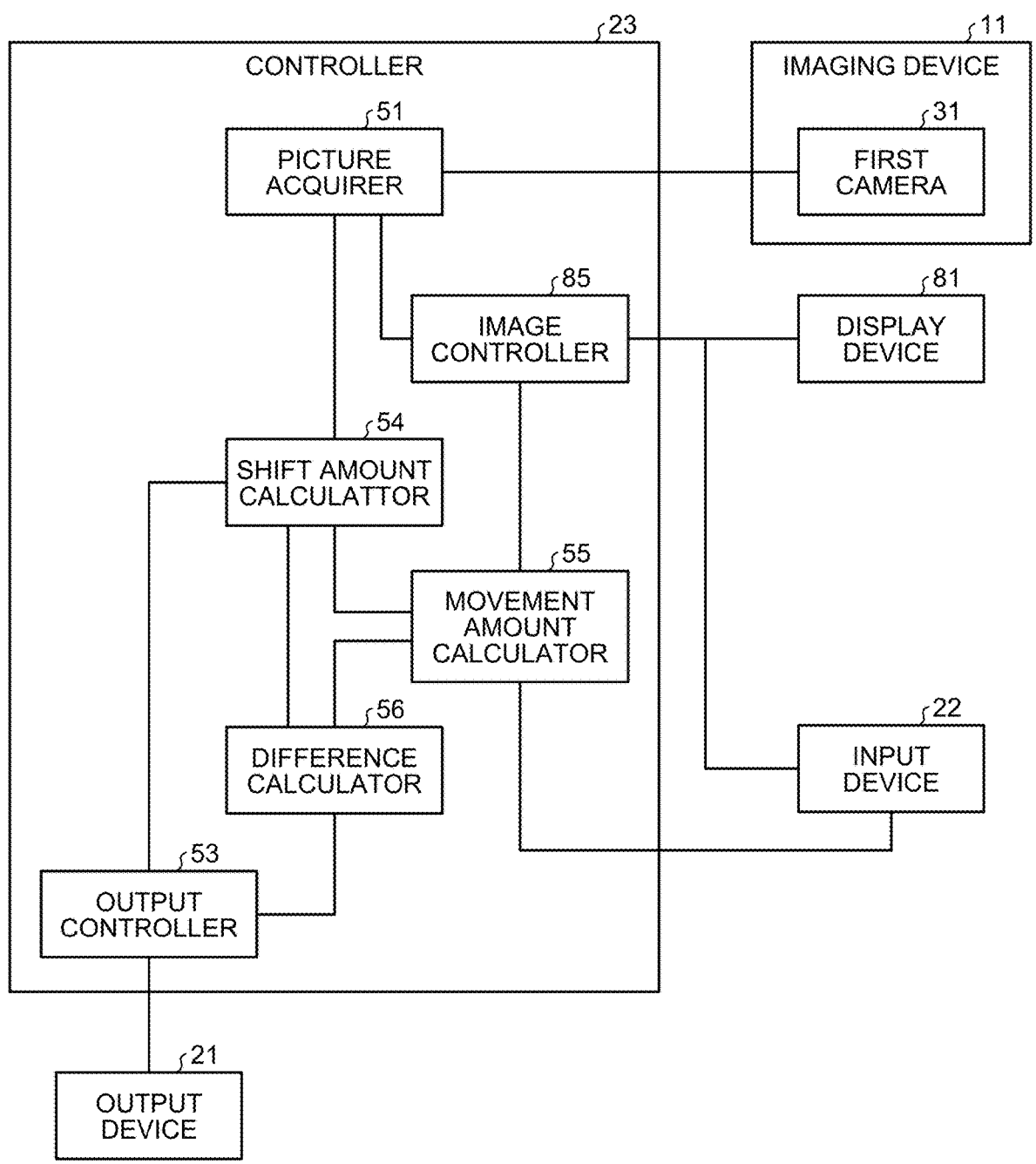
FIG. 14 is an exemplary functional block diagram illustrating a configuration of a controller in the fourth embodiment.

FIG. 14 is a functional block diagram illustrating a configuration of the controller 23 in the fourth embodiment. As illustrated in FIG. 14, in the fourth embodiment, the controller 23 further includes an image controller 85. For example, the CPU 41 reads out and executes a computer program stored in the ROM 42 or the storage 44, so that the controller 23 implements the image controller 85.

The image controller 85 controls the display device 81. The image controller 85 displays a pattern 39 on the screen 82a of the display device 81. Furthermore, the image controller 85 is capable of moving the pattern 39 on the screen 82a.

In the fourth embodiment, the picture acquirer 51 causes the first camera 31 to generate the picture P1 of the substance S. Next, the image controller 85 moves the pattern 39 displayed on the screen 82a. In other words, the image controller 85 displays the pattern 39 present in a different position from a position at the time of acquisition of the picture P1. After the pattern 39 is moved, the picture acquirer 51 causes the first camera 31 to generate the picture P2 of the substance. Thus, the two pictures P1 and P2 are acquired.

The measurement apparatus 10 and the measurement method in the fourth embodiment display the pattern 39 on the display device 81 that can display the pattern 39 in different positions. This makes it possible to acquire the two pictures P1 and P2 without physically moving the background device 12 displaying the pattern 39, thereby avoiding a decrease in the accuracy of measurements, which would otherwise occur caused by the physical movement of the background device 12.

The measurement apparatus 10 in the first to fourth embodiments can measure the shift amount Ds and the difference ΔD in various types of substance S. The measurement apparatus 10 can further calculate the refractive index gradient and physical characteristics of various types of substance S from the difference ΔD.

For example, the measurement apparatus 10 can calculate a refractive index gradient of gas in a space during processing such as laser beam machining or welding, or gas in a space in which an exterior unit of an air conditioner is placed, to calculate a difference in temperature in the space. The measurement apparatus 10 can further calculate the density distribution of an injection-molded optical component by calculating the refractive index gradient of the optical component. The measurement apparatus 10 can calculate the physical characteristics of the substance S, such as stress, temperature, pressure, strain, density, concentration, the direction of stress, the orientation of contents, the stress coefficient of a refractive index, the temperature coefficient of a refractive index, and a double refraction index.

According to at least one of the first to fourth embodiments, the two first picture and second picture generated by the imaging device each include a background image visible through a substance. The two pictures are acquired under conditions different in, for example, at least one of the imaging position of the imaging device at which the picture is formed, the position of the substance, and the position of the background image in the direction orthogonal to the optical axis of the imaging device. Thus, the first picture and the second picture mutually differ in positional relation between the background image and the substance. That is, in the two pictures, the background image, visible through the substance, is moved in the axis-orthogonal direction. Furthermore, at least one of the embodiments calculates the first displacement amount representing the difference between the two pictures in the position of the background image visible through the substance. As for a substance having a refractive index gradient and a different refractive index depending on the position, the first displacement amount varies depending on the position in the substance. Hence, the refractive index gradient of the substance can be found by calculating the first displacement amount at each position in the substance. Alternatively, at least one of the embodiments can exclude the arrangement or removal of a substance, facilitating the measurement of the substance. Alternatively, the two pictures can be acquired at a shorter interval to avoid a decrease in accuracy of measurements.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A measurement method, comprising:
   acquiring a first picture including a background image and a substance, the substance allowing transmission of light from the background image;
   acquiring a second picture including the background image and the substance in a different positional relation with respect to the first picture; and
   calculating a first displacement amount representing a difference in position of the background image between the first picture and the second picture.

2. The measurement method according to claim 1, further comprising:
   calculating a second displacement amount representing a difference in position of a referential portion of the background image between the first picture and the second picture; and
   subtracting the second displacement amount from the first displacement amount.

3. The measurement method according to claim 1, wherein the second picture is acquired after at least one of an imaging position at which the background image is formed, a position of the substance, and a position of the background image is changed in a direction orthogonal to an optical axis along which the first picture is acquired.

4. The measurement method according to claim 3, further comprising:
   calculating a second displacement amount representing a difference between the first picture and the second picture in distance in the direction orthogonal to the optical axis between the imaging position and the position of the background image at the time of acquiring each of the first picture and the second picture; and
   subtracting the second displacement amount from the first displacement amount.

5. A measurement apparatus, comprising:
   an imaging device that acquires a first picture and a second picture, the first picture and the second picture each including a background image and a substance, the substance allowing transmission of light from the background image; and
   a first displacement calculator that calculates a first displacement amount representing a difference in position of the background image between the first picture and the second picture, wherein
   the second picture differs from the first picture in positional relation between the background image and the substance in the direction orthogonal to the optical axis along which the first picture is acquired.

6. The measurement apparatus according to claim 5, further comprising:
   a second displacement calculator that calculates a second displacement amount from a difference in position of the background image between the first picture and the second picture; and
   a third displacement calculator that subtracts the second displacement amount from the first displacement amount.

7. The measurement apparatus according to claim 5, further comprising
   a moving device that moves the imaging device, the substance, or the background image in the direction orthogonal to the optical axis.

8. The measurement apparatus according to claim 5, further comprising
   a beam splitter that is located between the imaging device and the background image, and splits light traveling along the optical axis between the imaging device and the background image.

9. The measurement apparatus according to claim 5, further comprising
   an optical system that is located between the imaging device and the background image, and splits, into parallel beams, light traveling along the optical axis from the background image toward the imaging device.

* * * * *